United States Patent [19]

Franken

[11] 4,396,446
[45] Aug. 2, 1983

[54] METHOD FOR PRODUCING AN OPTICAL TELECOMMUNICATION ELEMENT

[75] Inventor: Adrianus J. J. Franken, Eindhoven, Netherlands

[73] Assignee: U.S. Philips Corporation, New York, N.Y.

[21] Appl. No.: 223,462

[22] Filed: Jan. 8, 1981

[30] Foreign Application Priority Data

Jan. 22, 1980 [NL] Netherlands .......................... 8000382

[51] Int. Cl.³ .......................... B32B 5/02; B32B 5/14
[52] U.S. Cl. ................................ 156/161; 29/33 D; 29/178; 29/203; 29/1.5; 29/96.23
[58] Field of Search ............... 156/178, 176, 179, 203, 156/161, 162, 165; 350/96.23, 96.24; 29/33 D; 228/144, 145, 148, 150; 264/1.5

[56] References Cited

U.S. PATENT DOCUMENTS

| | | | |
|---|---|---|---|
| 3,751,623 | 8/1973 | Doublet | 228/150 |
| 3,813,098 | 5/1974 | Fischer | 156/162 |
| 4,138,193 | 2/1979 | Olszewski et al. | 350/96.23 |
| 4,146,302 | 3/1979 | Jachimowicz | 350/96.23 |
| 4,184,860 | 1/1980 | Schneider et al. | 65/3 |
| 4,289,375 | 9/1981 | Andersen et al. | 350/96.23 |

FOREIGN PATENT DOCUMENTS

| | | |
|---|---|---|
| 1065137 | 10/1979 | Canada . |
| 2701650 | 5/1978 | Fed. Rep. of Germany . |
| 7507580 | 12/1975 | Netherlands . |
| 1518082 | 7/1978 | United Kingdom . |

*Primary Examiner*—Michael W. Ball
*Attorney, Agent, or Firm*—Marc D. Schechter

[57] ABSTRACT

An optical communication element comprises an optical fiber bonded in a state of axial compression to a metal tape. The tape may be folded up into a tube and sealed by soldering. Such elements are strong and not sensitive to stress corrosion.

Such an optical communication element may be produced by passing a metal tape and an optical fiber in contact around a drum with the optical fiber on the outside. An adhesive, which solidifies or cures during the passage around the drum is applied to the metal tape.

8 Claims, 3 Drawing Figures

METHOD FOR PRODUCING AN OPTICAL TELECOMMUNICATION ELEMENT

BACKGROUND OF THE INVENTION

The invention relates to an optical communication element for use in an optical telecommunication cable. The element comprises at least one optically conducting glass fiber bonded to a metal tape by means of an adhesive.

The invention also relates to a method of producing such an optical communication element in which the glass fiber is attached to the metal tape by means of the adhesive.

In addition, the invention relates to an apparatus for producing an optical communication element and an optical telecommunication cable.

The optical communication elements according to the invention are intended to be incorporated in optical telecommunication cables. The optically conductive fibers are incorporated in such elements before they are assembled into cables in order to strengthen the optical fibers. Furthermore, unprotected glass fibers are very susceptible to bending which causes the optical properties of the glass fibers to deteriorate considerably. In addition, glass fibers are sensitive to stress corrosion.

U.S. Pat. No. 4,138,193 describes an optical communication element which has been assembled from some optical glass fibers which have been coated with a conventional layer. The glass fibers are bonded to a metal tape by means of an adhesive. The glass fibers are covered with a polyester film. the metal tape may be wound in the form of a spiral around a core for producing an optical cable. Compared with a synthetic resin material tape the use of a metal tape has the advantage that the element is stronger and has a greater resistance to temperature changes due to the relatively low coefficient of expansion of metal. The known element is not moisture resistant since all synthetic resin materials, and consequently also the polyester cover film, are to some extent permeable to moisture.

SUMMARY OF THE INVENTION

The invention provides an element which is stronger than the known element.

In addition, the invention provides a first special embodiment which has improved resistance to temperature changes. According to a second special embodiment the invention provides an element which has improved resistance to the influence of moisture. It is a further object of the invention to provide a method of and apparatus for manufacturing such an optical communication element.

The basic notion for obtaining a stronger element is based on the fact that a glass fiber, when subjected to and axially compressive stress, can absorb a higher tensile load than a glass fiber which is not subjected to axially compressive stress. Moreover, such a glass fiber is not sensitive to stress corrosion, which only occurs under a tensile load. In order to obtain an element which is optically resistant to temperature changes the metal and the glass of the glass fibers must have approximately equal coefficients of thermal expansion. In order to obtain an element which is sealed in a moisture-tight manner, which is important to prevent corrosion from occurring, a metal envelope is used to ensure that an adequate seal is obtained.

The optical communication element according to the invention is characterized in that the glass fiber is bonded to the metal tape with the fiber in a state of axial compressive stress. A first embodiment of the optical communication element, which embodiment is particularly resistant to temperature changes, has the special feature that a metal tape is used which is made of an alloy which has approximately the same coefficient of thermal expansion as the glass fiber. According to a second embodiment, which is particularly resistant to moisture, the metal tape is folded-up into a tube and sealed by soldering.

The use of optical communication elements in which the glass fibers are kept under an axially compressive stress is known per se from German patent application No. 2701650 (corresponding to U.S. Pat. No. 4,289,375). With this known element a synthetic resin material coating which adheres to the glass fiber is provided around the glass fiber by means of extrusion. When the synthetic resin material coating is cooled, it shrinks and subjects the glass fiber to an axially compressive stress. The known elements have the drawback that it is difficult to adjust the compressive stress accurately. In addition, the compressive stress decreases slowly with time and decreases more rapidly when the temperature is increased, due to a relaxation of the synthetic resin material.

According to the invention, the method of producing an optical communication element of the type described above is characterized in that the glass fiber and an adhesive, which has not yet been cured or solidified, are applied to the metal tape. The metal tape is thereafter passed around a drum, the surface of the metal tape onto which the glass fiber has been disposed facing away from the drum, and the glue is cured or solidified during the passage around the drum. The diameter of the drum, the thickness of the metal tape and the diameter of the glass fiber are chosen such that the path length of the metal tape is at least 0.5 parts per thousand shorter than the path length of the glass fiber.

Netherlands patent application No. 7507580 describes a method in which an optical glass fiber is glued to a synthetic resin material tape and is thereafter passed between a pair of rollers which grip the tape and apply a tensile stress to draw the glass fiber from the melt. The tape is, however formed into an S-shape by means of the rollers to avoid any pretension in the coated tape. The effect of this is that the glass fiber is not bonded to the tape in a state of axially compressive stress.

The arrangement according to the invention for producing an optical communication element of the type as described above comprises at least a first feeder element for a metal tape, a second feeder element for applying one or more optical fibers onto the tape, and a drum around which the metal tape carrying the optical fiber can be slid.

DESCRIPTION OF THE PREFERRED EMBODIMENTS

Figure 1:
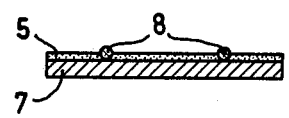
FIG. 1 is a cross-sectional view transverse to the axes of the fibers of an embodiment of the optical communication element according to the invention comprising two optically conductive glass fibers.

FIG. 1 shows a cross-section through an optical communication element according to the invention. The element comprises one or more optical fibers 8 (two in the embodiment shown) which are bonded to a metal tape 7 by means of an adhesive 5. The fibers have been subjected to an axially compressive stress. All types of optical fibers such as, for example, "graded index" fibers, soft-glass fibers, quartz fibers, etc. may be used as optical fibers in the element according to the invention. The optical fibers may have been provided, for example immediately after the fibers have been drawn from the melt, with a synthetic resin material coating.

All known adhesives which are suitable for bonding glass to metal may be used as the adhesive 5. When the glass fibers have been provided with a synthetic resin material coating, an adhesive must be used by means of which the synthetic resin material can be bonded to metal. In order to make a rapid and simple manner of protection possible, rapidly curing types of adhesives are preferably used. Particularly suitable are the so-called hot melt adhesives. These types of adhesives are described in the book *Hot Melt Adhesives* by D. L. Bateman (1978), the contents of which are incorporated herein by reference.

The metal tape 7 may consist of any metal or metal alloy which can be worked into a tape. Preferably, however, metals or metal alloys are used which have approximately the same coefficient of expansion as the glass fibers. When the coefficient of expansion of the metal of the metal tape is approximately equal to the coefficient of expansion of the glass of the optical fibre, an element is obtained which is adequately resistant to temperature fluctuations. When soft-glass fibers having a coefficient of thermal expansion of 9 to $11 \times 10^{-6°}$ C. are used, a metal tape is preferably used which is produced from an iron-chromium alloy having 17 to 19% by weight of chromium. In combination with quartz fibers a metal tape which is produced from an iron-nickel is preferred alloy having 36% by weight of nickel.

In the element according to the invention the optical fibers are bonded to a metal tape with the fiber in a state of axial compression. When the element is subjected to a tensile load, the compressive stress must be overcome before a tensile stress can be applied to the fibers. This results in an increase of the tensile strength of optical fibers in the element by a value which corresponds to the compressive stress. In order to obtain a sufficient increase in the tensile strength it is recommended to bond the fibers under such an axially compressive stress that the length of the fibers is shortened by at least 0.5 parts per thousand. A method by means of which such an element can be obtained will be described, below.

The element shown in FIG. 1 may be made into an optical cable in several ways. A plurality of the elements shown in FIG. 1 can be stacked and the whole assembly can be provided with a suitable jacket. According to another method, the element of FIG. 1 can be spiraly wound around a core which takes up the stress on the cable in use. Afterwards, the whole assembly is provided with a cable jacket. In short, all known techniques can be used to make the elements into a cable.

Figure 2:
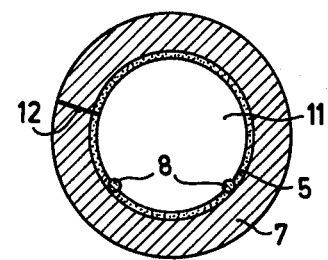
FIG. 2 is a cross-sectional view of the element of FIG. 1 folded up into a tube.

FIG. 2 shows another embodiment of the element according to the invention. The embodiment shown in FIG. 2 is produced by folding up the metal tape of the embodiment of FIG. 1 into a tube. To make the element moisture-resistant, the edges of the metal tape are sealed by soldering in the region of reference numeral 12. The cavity 11 can be filled up by injecting a foam or a gel therein. This prevents moisture from being distributed over the entire length of the element in case of any leakage in the metal tape 7 or the soldered seam 12.

Several methods of manufacture are in principle suitable to produce the element according to the invention. The metal tape may, for example, be heated, causing it to expand. In this hot state a cold optical fiber can then be bonded to the metal tape. After cooling the metal tape shrinks and consequently exerts an axially compressive stress on the optical fiber. Other methods are of course conceivable.

Figure 3:
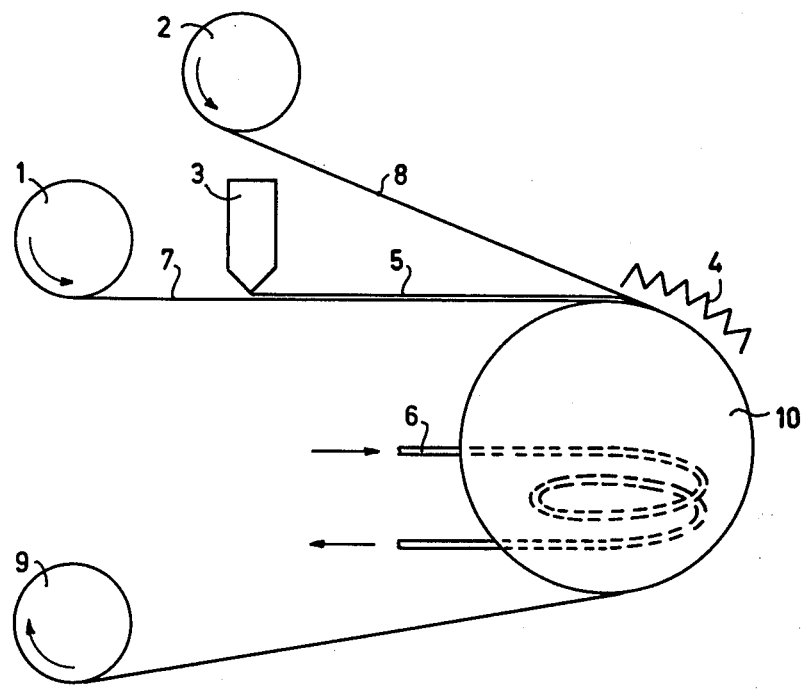
FIG. 3 is a schematic representation of an embodiment of an apparatus for producing an element as shown in FIG. 1.

The invention provides a particularly simple and practical method of obtaining an optical communication element of the type described above. In addition, the invention provides an apparatus with which this method can be carried out. This method and the apparatus will now be explained with reference to FIG. 3, which shows the apparatus schematically.

The method of manufacture can be explained as follows. A metal tape 7 is unwound from a feed reel 1. The metal tape may, for example, consist of steel having a modulus of elasticity of 21,000 kg per cm² and may be 0.1 mm thick and 3 mm wide. By means of an adhesive dispensing and spreading device 3 a suitable adhesive, for example a hot melt adhesive, is applied to the metal tape 7. In this way an adhesive layer 5 is obtained on the metal tape 7. At the same time, an optical fiber 8 is guided from feed reel 2 into the adhesive layer 5 on the metal tape 7. An optical fiber having a diameter of 0.1 mm made of a glass having a modulus of elasticity of 7,000 kg per mm² may be used. The procedure should be such that the adhesive melt has not yet solidified in the region of the first contact between the optical fiber 8 and the metal tape 7. This may require the provision of some heating elements 4. These heating elements may of course be alternatively provided in other positions or, optionally, in a greater or smaller number.

The metal tape 7 supporting the adhesive layer 5 and optical fiber 8 is slid around a stationary drum 10. The adhesive layer solidifies during the passage of the tape around the drum. To achieve this it may be necessary to provide the drum with a cooling coil 6, through which cooling water is passed. Alternatively, it is of course possible to ensure solidification of the melt adhesive during the passage around the drum by means of air cooling, etc. The finished product is then discharged from the drum 10 and wound on a reel 9.

Several feed reels 2 may of course be used when more than one optical fiber must be applied to the metal tape 7. The melt adhesive 5 can be applied in the liquid state onto the metal tape 7 by means of the adhesive dispensing device or in the form of a film which is induced to melt by heating elements 4.

When a drum 10 having a radius of 60 mm is used the compressive stress causes the optical fiber to shrink 1.5 parts per thousand in the above-described example, which means in this example that the optical fiber is not relieved of the compressive stress until the applied load exceeds 10 kg.

In manufacturing the embodiment of FIG. 2, one or more elements, not shown, must be provided between drum 10 and winding reel 9 by means of which the metal tape 7 can be folded up into a tube and sealed by soldering. In addition, the arrangement may comprise an element, not shown, by means of which a foam or a gel can be introduced into the folded-up cable.

What is claimed is:

1. A method of producing an optical communication element comprising at least one optical fiber bonded to a metal tape, said method comprising the steps of:

providing a metal tape having first and second opposite sides;

applying an uncured adhesive layer to the first side of the metal tape;

contacting an optical fiber to the adhesive on the first side of the metal tape;

passing the metal tape around a drum, the second side of the tape contacting the drum; and curing the adhesive during its passage around the drum;

characterized in that the drum has a diameter, the metal tape has a thickness, and the optical fiber has a diameter, all of which are chosen so that the metal tape has a path length around the drum which is at least 0.5 parts per thousand shorter than the path length of the optical fiber around the drum, thus providing axial compression in the adhered optical fiber.

2. A method as claimed in claim 1, characterized in that the uncured adhesive is a molten hot melt adhesive which is cured by solidification.

3. A method as claimed in claim 2, characterized in that the drum does not rotate, the metal tape is fed onto the drum at a feeder portion of the drum, the metal tape leaves the drum at a discharge portion of the drum, and the method further comprises the steps of:

heating the drum at the feeder portion; and cooling the drum at the discharge portion.

4. A method as claimed in claim 3, characterized in that after the adhesive is cured, the method further comprises the steps of:

folding the metal tape to form a tube; and sealing the folded tape by soldering.

5. A method as claimed in claim 4, characterized in that the method further comprises the step of filling the tube formed by the metal tape with a foam.

6. A method as claimed in claim 4, characterized in that the method further comprises the step of filling the tube formed by the metal tape with a gel.

7. A method as claimed in claim 1, characterized in that the metal tape is an iron-nickel alloy with 36 weight % nickel, and the optical fiber is quartz glass.

8. A method as claimed in claim 1, characterized in that the metal tape is an iron-chromium alloy with 17 to 19 weight % chromium, and the optical fiber is made of a glass having a coefficient of thermal expansion of 9 to $11 \times 10^{-6}$° C.

* * * * *